(12) United States Patent
Bejerano et al.

(10) Patent No.: US 7,606,142 B2
(45) Date of Patent: Oct. 20, 2009

(54) METHOD AND SYSTEM FOR SHARED BACKUP ALLOCATION IN NETWORKS BASED ON PARTIAL INFORMATION

(75) Inventors: Yigal Bejerano, Springfield, NJ (US); Joseph Seffi Naor, Haifa (IL); Alexander Sprintson, Pasadena, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 825 days.

(21) Appl. No.: 10/955,265

(22) Filed: Sep. 30, 2004

(65) Prior Publication Data
US 2006/0067243 A1 Mar. 30, 2006

(51) Int. Cl.
*H04L 12/26* (2006.01)
(52) U.S. Cl. .................. 370/217; 370/228; 370/252
(58) Field of Classification Search ............. 370/216, 370/217, 218, 219, 220, 221, 225–228, 230, 370/252, 253, 401
See application file for complete search history.

(56) References Cited

U.S. PATENT DOCUMENTS

| | | | | |
|---|---|---|---|---|
| 5,233,604 A | * | 8/1993 | Ahmadi et al. | 370/238 |
| 6,584,071 B1 | * | 6/2003 | Kodialam et al. | 370/238 |
| 6,904,462 B1 | * | 6/2005 | Sinha | 709/226 |
| 7,124,187 B1 | * | 10/2006 | Kodialam et al. | 709/226 |
| 2002/0067693 A1 | * | 6/2002 | Kodialam et al. | 370/216 |
| 2002/0105904 A1 | * | 8/2002 | Hauser et al. | 370/218 |
| 2002/0172149 A1 | * | 11/2002 | Kinoshita et al. | 370/216 |

OTHER PUBLICATIONS

Kodialam et al., "Dynamic Routing of Bandwidth Guaranteed Tunnels with Restoration".
National Institute of Standards and Technology (NIST), "NP-hard", http://www.nist.gov/dads/HTML/nphard.html, Feb. 20, 2004.
Kodialam et al., "Dynamic Routing of Locally Restorable Bandwidth Guaranteed Tunnels using Aggregated Link Usage Information" IEEE INFOCOM, 2001, pp. 376-385, Anchorage, Alaska.
Li Li et al., "Routing Bandwidth Guaranteed Paths with Local Restoration in Label Switched Networks", Proc. IEEE International Conference on Network Protocols (ICNP), Nov. 2002, pp. 1-11.

* cited by examiner

*Primary Examiner*—Ricky Ngo
*Assistant Examiner*—Gary Mui (57) ABSTRACT

A method comprises allocating a respective restoration path to protect each of a plurality of primary paths in a network. Each primary path has a plurality of nodes and at least two subpaths connecting the nodes of the primary path. Each restoration path includes at least one link. Each link protects at least one of the subpaths of the primary path. Each of the subpaths of the primary path is protected. None of the links in the restoration path is included in the corresponding primary path. At least one of the links is shared among at least two restoration paths corresponding to at least two of the primary paths.

26 Claims, 6 Drawing Sheets

METHOD AND SYSTEM FOR SHARED BACKUP ALLOCATION IN NETWORKS BASED ON PARTIAL INFORMATION

FIELD OF THE INVENTION

The present invention relates to communications networks generally, and more specifically to methods and systems for designing and implementing primary and backup link topologies.

BACKGROUND

Modern communication networks are required to provide Quality of Service (QoS) assurance and fault resilience, while maximizing their utilization. This prompts the need for new dynamic restorable routing algorithms that exploit restoration resource sharing for achieving these goals. The best possible sharing can be obtained when the routing algorithms have complete information of all primary and restoration paths. However, representing this information can be quadratic in the number of links, making it impractical in large networks. Recently, M. Kodialam and T. V. Lakshman, "Restorable Dynamic Quality of Service Routing," *IEEE Communications Magazine*, vol. 40, no. 6, pp. 72-81, 2002, also described in U.S. Pat. No. 6,584,071, (both of which are incorporated by reference herein in their entireties) have shown that significant resource sharing can be obtained when only partial information is available. Their work inspired the development of new routing algorithms that allow for considerable resource sharing. However, these algorithms do not provide any guarantee on the quality of the solutions.

Quality of Service (QoS) assurance and fault resilience have become fundamental requirements from modern communication networks such as MPLS-based IP networks, ATM and optical networks. These requirements are essential for supporting new real-time applications such as video conferencing and multimedia streaming. In current networks, resilience to failures is obtained by providing primary and restoration paths between each source-destination pair. QoS is guaranteed by allocating enough network resources, in terms of bandwidth and buffer space, along these paths. This calls for establishing efficient restorable routing mechanisms for providing adequate primary and restoration paths while maximizing the network utilization.

There is a rich body of work in the areas of network survivability and restorable routing, teaching that restorable routing mechanisms are required to provide resilience only for a single element failure (link or node) as these failures are rare events and the probability of two simultaneous failures is very low. Consequently, most current routing mechanisms provide fault tolerance by the means of 1+1 or 1:1 protection. In a 1+1 protection scheme, two disjoint paths are provided and data are sent on both of them. The receiver uses the data that arrive on one of them (according to various criteria) and discards the data of the other path. This approach guarantees a fast recovery in case of failure, as the receiver just needs to switch from one path to the other. However, this fast recovery is obtained at the expense of low network utilization, since more than twice the required network resources are allocated to each connection. In a 1:1 protection scheme, the routing mechanism also provides two disjoint paths, but, the data are sent only on one path, termed the primary path, and the restoration path is activated (by signaling) only in case of failure. Because protection is only sought for a single element failure, restoration resources can be shared by multiple restoration paths as long as their primary paths are not susceptible to the same failures, i.e., there are disjoint primary paths. To summarize, these two approaches present a clear tradeoff between recovery time and network utilization.

H. Hwang, S. Ahn, Y. Choi, and C. Kim, "Backup Path sharing for Survivable ATM Networks," in Proceedings of ICOIN-I2, January 1998, and M. S. Kodialam and T. V. Lakshman, "Dynamic Routing of Bandwidth Guaranteed Tunnels with Restoration," in Proceedings of IEEE INFOCOM '2000, Tel-Aviv, Israel, March 2000 teach the ability to improve network utilization by using shared restoration resources, have prompted a search for restorable routing algorithms that exploit resource sharing for maximizing the network utilization, while still providing QoS guarantees. Generally speaking, the proposed methods can be divided into two categories.

Several papers consider the network design problem of providing an overlay topology with minimal allocated resources that provides restoration and QoS assurance for a known set of connection requests, where each request comprises a source-destination pair and a bandwidth demand. These include: Y. Liu, D. Tipper, and P. Siripongwutikorn, "Approximating Optimal Spare Capacity Allocation by successive Survivable Routing," in Proceedings of IEEE INFOCOM '01, Anchorage, Ak., April 2001; O. Hauser, M. Kodialam, and T. V. Lakshman, "Capacity Design of Fast Path Restorable Optical Networks," in Proceedings of IEEE INFOCOM '02, New York, N.Y., June 2002; C. Chekuri, A. Gupta, A. Kumar, J. Naor, and D. Raz, "Building Edge-Failure Resilient Networks," in Proceedings of IPCO 2002, May 2002; and G. Italiano, R. Rastogi, and B. Yener, "Restoration Algorithms for Virtual Private Networks in the Hose Model," in Proceedings of IEEE INFOCOM '02, New York, N.Y., June 2002.

Another set of papers addresses the issue of dynamic restorable routing with shared resources. Here, the system does not have a priori knowledge of the connection requests and these studies propose different on-line routing schemes that handle the connection requests one by one. These schemes are required to minimize the amount of new allocated resources per request (the so called connection cost), while insuring QoS requirements and fault tolerance. X. Su and C.-F. Su, "An Online Distributed Protection Algorithm in WDM Networks," in Proceedings of IEEE ICC '01, June 2001; S. Sengupta and R. Ramamurthy, "Capacity Efficient Distributed Routing of Mesh-Restored Lightpaths in Optical Networks," in Proceedings of IEEE GLOBECOM '01, November 2001; E. Bouillet, J.-F. Labourdette, G. Ellinas, R. Ramamurthy, and S. Chaudhuri, "Stochastic Approaches to Route Shared Mesh Restored Lightpaths in Optical Mesh Networks," in Proceedings of IEEE INFOCOM '02, New York, N.Y., June 2002; G. Li, D. Wang, C. Kalmanek, and R. Doverspike, "Efficient Distributed Path Selection for Shared Restoration Connections," in Proceedings of IEEE INFOCOM '02, New York, N.Y., June 2002.

One criterion for distinguishing between dynamic routing schemes is the information available to the algorithm. Kodialam and Lakshman show that the level of sharing depends on the kind of link-usage information that is available to the routing algorithm, and lead them to introduce three different information models. The first model is called the no information model, in which only the capacity and the total reserved bandwidth on each link are known and there is no knowledge available on restoration resources. Consequently, the routing algorithm cannot exploit resource sharing and the amount of allocated resources is the same as in the case of 1+1 protection. The second model is called the complete information model, since the routes of the primary and the restoration paths of every connection are known. This information permits the best possible sharing. However, in large networks this is not practical due to the large amount of required information. The third model is an intermediate one and it is called the partial information model since the system keeps (slightly) more information than the no-information model. In this model, rather than knowing only the total reserved bandwidth of each link, the system is aware of the total bandwidth reserved for both primary paths and the bandwidth allocated for restoration on each link. Simulations show that with only a modest amount of information, the partial information model achieves significant resource sharing, and in many cases, an exact bandwidth reservation is made on each link. This makes the performance of the partial information model close to the ideal complete information case.

C. Qiao and D. Xu, "Distributed Partial Information Management (DPIM) Schemes for Survivable Networks—Part i," in Proceedings of IEEE INFOCOM '02, New York, N.Y., June 2002; and D. Xu, C. Qiao, and Y. Xiong, "An Ultra-Fast Shared Path Protection Scheme—Distributed Partial Information Management, part ii," in Proceedings of ICNP '02, Paris, France, 2002, presented a distributed partial information management (DPIM) framework for restorable routing and described both IP-based and fast heuristic-based routing algorithms. By simulations, the authors have shown that these schemes perform better than the previous partial information schemes.

In Y. Xiong, C. Qiao, and D. Xu, "Achieving Fast and Bandwidth-Efficient Shared-Path Protection," Journal of Lightwave Technology, vol. 21, no. 2, pp. 365-371, 2003, the authors observed that the DPIM framework tends to select long restoration paths over links with high restoration bandwidth. This phenomenon affects the recovery time and the paper presents a method for balancing between resource sharing and the restoration path length.

M. Kodialam and T. V. Lakshman, "Dynamic Routing of Locally Restorable Bandwidth Guaranteed Tunnels Using Aggregated Link Usage Information," in *Proceedings of IEEE INFOCOM '01*, Anchorage, Ak., April 2001, extends the authors' schemes for local restoration, where each link or node in the primary path is protected by a bypass backup path. The paper presents a local restoration routing scheme that reduces the system recovery time while obtaining the network utilization similar to the global restoration approach.

All the above-mentioned studies have illustrated by simulation that using resource sharing significantly improves the network utilization in both the complete and the partial information models. However, the proposed schemes do not provide any guarantee on the quality of the calculated solutions.

SUMMARY OF THE INVENTION

In some embodiments, a method allocates bandwidth in a network having at least two primary paths. The method uses a computer to identify a bridge set for each primary path. Each bridge set includes a plurality of bridges, such that each link of the respective primary path is protected by at least one bridge of the respective bridge set. Each bridge protects a subpath connecting two of the nodes of one of the primary paths. Each bridge has at least one link. None of the bridges shares any link with the subpath of the respective primary path protected by that bridge. A first one of the bridges that protects one of the subpaths of the first primary path and a second one of the bridges that protects one of the subpaths of the second primary path have at least one common link.

In some embodiments, a method comprises allocating a respective restoration path to protect each of a plurality of primary paths in a network. Each primary path has a plurality of nodes and at least two subpaths connecting the nodes thereof. Each restoration path includes at least one link. Each link protects at least one of the subpaths of one of the primary paths. Each of the subpaths of each primary path is protected. None of the links in one of the restoration paths is included in the corresponding primary path. At least one of the links is shared among at least two restoration paths corresponding to at least two of the primary paths.

DETAILED DESCRIPTION

This description of the exemplary embodiments is intended to be read in connection with the accompanying drawings, which are to be considered part of the entire written description. In the description, relative terms such as "left," "right," as well as derivative thereof should be construed to refer to the orientation as then described or as shown in the drawing under discussion. These relative terms are for convenience of description and do not require that the apparatus be constructed or operated in a particular orientation. Terms concerning coupling and the like, such as "connected" and "interconnected," refer to any relationship wherein nodes are in electrical communication with one another, either directly or indirectly through intervening nodes, by way of wired or wireless transmission media, unless expressly described otherwise.

Exemplary embodiments are described herein that include local restoration with sharing. Local restoration use a plurality of bridges; each bridge protects a portion of a primary path. It is not necessary to provide a single bridge that protects all portion of an entire primary path. Although local restoration may be used in embodiments having a single primary path, it is also advantageous in networks and embodiments having a plurality of primary paths. Through sharing, bridges that protect different primary paths can have common links and share bridges.

The exemplary embodiments address the dynamic restorable routing problem of providing a backup path regardless of the failure of any single node or link in the primary path using approximation algorithms. These algorithms provide a worst-case guarantee that the solution has a cost that exceeds the absolute minimum cost by no more than a known factor. Efficient algorithmic solutions are provided herein for resource sharing that are within a certain factor (4 log n) away from the optimum. Such a solution does not exist using a disjoint path approach for primary and restoration paths. The problem of finding disjoint primary and restoration paths is NP-hard. Moreover, it is intractable to find even an approximate solution to this problem, both in the complete and the partial information models.

A local restoration approach referred to herein as "bridge set" is provided, in which a primary path is associated with a set of bridges, each protecting a portion of the primary path. One or more links of the primary path (other than the failed link) may be used in the presence of a single link or single node failure. A bridge may share one or more links with other bridges, but this is not a requirement. This approach has several advantages over the disjoint path strategy, including higher network utilization, and it enables one to construct an efficient approximation algorithm for the partial information model. The algorithm has an O(log n) approximation factor where n is the maximum number of nodes in the primary path.

Although the bridge set approach was used for providing fault resilience to QoS paths with strict delay constraints when using dedicated resources (See Y. Bejerano, Y. Breitbart, A. Orda, R. Rastogi, and A. Sprintson, "Algorithms for computing qos paths with restoration," in Proceedings of IEEE INFOCOM '03, San Francisco, Calif., USA, April 2003; G. Krishna, M. Pradeep, and C. Ram Murthy, "A segmented backup scheme for dependable real time communication in multihop networks," in Proceedings of Workshop on Parallel and Distributed Real-Time Systems (WPDRTS '2000), Cancun, Mexico, May 2000), the inventors are not aware of any use of bridge sets for obtaining efficient resource sharing of restoration paths. The bridge set approach has several advantages over the disjoint path approach. First, it finds a less expensive solution in terms of resource consumption. Second, it may provide solutions when none exists for disjoint path strategy. Third, the bridge set strategy uses fewer backup links upon a failure, which facilitates a more efficient sharing of backup bandwidth. Fourth, it reduces the network recovery time by activating a local bridge with a small number of links, rather than switching to a completely new path.

A new dynamic restorable routing scheme is provided for the partial information model. Finding such a scheme that provides performance guarantees is complicated by two types of resource sharing. The first one is external sharing defined to be the network resources that are shared by several bridge sets belonging to different connections. The second one is internal sharing where several bridges belonging to the same bridge set share resources. While external sharing is known in advance and can be taken into account by the link costs, internal sharing results from the selection of bridges that comprise the bridge set. Consequently, the latter complicates the process of finding a set of optimal bridges. The exemplary routing schemes includes the following two features. First, the issue of internal sharing is addressed. One can observe that for a given primary path of length n, there is an optimal bridge set such that each link is included in at most 4 log n bridges. This allows one to ignore internal sharing in the construction of bridge sets, while guaranteeing that their cost is at most 4 log n times the optimum. The second feature is the concept of a super bridge, which is a combination of a main ("leading") bridge and nested bridges that provide low cost protection for a given interval of the primary path. This concept enables one to construct a dynamic program that finds the optimal bridge set of a given primary path when internal sharing is ignored. Further, these building blocks are used for developing an efficient algorithm that finds both a primary path and a bridge set whose cost is at most, O(log n) times the optimum. Here, n is the number of nodes in the primary path. Since, in practice, the diameter of a network with N nodes may only be, O(log N), in such a case the approximation factor is O(log log N). Furthermore, since the exemplary scheme utilizes a dynamic programming that performs only shortest path calculations, its time complexity is, $O(n^3(M+N \log N))$, where n, N and M are the network diameter, the number of nodes and the number of links, respectively. This makes it more attractive than most other dynamic routing algorithms that need to solve linear programs.

Nomenclature—The following symbols are used below:

G(V,E)—The graph of the considered network.
$N=|V|$—The number of nodes in G.
$M=|E|$—The number of links in G.
(s, t, d)—Connection between s to t with demand d.
$P(v_i, v_j)$—A subpath of P between . $v_i$,. to $v_j$
$P_1 \circ P_2$—Path concatenation.
n.—The hop count of P.
Network diameter—the maximum number of nodes in the primary path
$g_l$—The capacity of link l.
$r_l$—The residual bandwidth of link l.
$b_l$—The amount of backup bandwidth of link l.
$f_l$—The amount of primary bandwidth of link l.
$c_l$—The bandwidth allocation cost of link l.
B—A bridge.
$F(B_i)$—The protected domain of bridge i.
$\zeta(B_i)$—The amount of traffic protected by $B_i$.
R—A Bridge Set (BS).
$\beta_l$—The required backup bandwidth on link l.
$\Delta b_l$—Additional backup bandwidth required on link l.

The Network Model

The network can be represented by an undirected graph G(V, E), where V is the set of nodes and E is the set of links and the numbers of network nodes and links are denoted by N and M, respectively, i.e., $N=|V|$ and $M=|E|$. Each link l∈E has a fixed capacity, denoted by $g_l$, which is the total amount of bandwidth that can be reserved on a link l. Link l is associated with a cost $c_l$ that specifies the amount of network resources consumed by allocating a unit of bandwidth on it. Thus, reserving d units of bandwidth on link l incurs a cost of $d \cdot c_l$.

An (s,t)—path is a sequence of distinct nodes $P=\{s=v_0, v_1, \ldots, t=v_n\}$, such that, for $0 \leq i \leq n-1$, $(v_i, v_{i+1}) \in E$. Here, $_{n=|P|}$ is the hop count of P. The subpath of P that extends from $v_i$ to $v_j$ is denoted by $P(v_i, v_j)$ and $P(u, v) \circ P(v, w)$ denotes the (u, w)—path formed by the concatenation of P(u, v) and P(v, w).

A dynamic restorable routing mechanism may be used to handle each received connection request separately. Each connection request is characterized by a triplet (s, t, d) that specifies its source node s, destination node t and the bandwidth demand d.

Path Restoration Strategies

Restoration approaches may be local or global. The global restoration approach provides two disjoint paths between s and t, one being the primary path and the second being the restoration path. The local restoration approach provides in contrast a primary path and a set of bridges. Each bridge protects a portion of the primary path, as follows, Definition 1 (Bridge) Let $P=\{s=v_0, \ldots, t=v_n\}$ be a primary path. A path $B_i$ from $s_i \in \hat{P}$ to $t_i \in \hat{P}$ that has no common links with the subpath $\hat{P}(s_i,t_i)$ of $\hat{P}$ is referred to as a bridge.

Let $\hat{P}=\{s=v_0, \ldots, t=v_n\}$ be a primary path, $B_i=\{s_i, \ldots, t_i\}$ be a bridge and l be a link that belongs to the subpath $\hat{P}(s_i,t_i)$ of $\hat{P}$. Bridge $B_i$ is said to protect link l if upon a failure of the link, the connection switches to the restoration path $\hat{P}$ formed by bridge $B_i$, i.e.,. $\hat{P}=\hat{P}(s,s_i) \circ B_i \circ \hat{P}(t_i,t)$. In general, bridge $B_i$ protects several links in the primary path $\hat{P}$. Accordingly, each bridge $B_i$ is associated with an attribute $F(B_i)$, which specifies the subset of links in $\hat{P}$ protected by bridge $B_i$. The term $F(B_i)$ is referred to as the protected domain of bridge $B_i$. The set of bridges that protects all links in $\hat{P}$ is referred to as a BridgeSet.

Definition 2 (Bridge Set (BS)) Let $\hat{P}=\{v_0, \ldots, t=v_n\}$ be the primary path. A bridge set R is a set of bridges $B_1, B_2 \ldots, B_k$ such that each link $l \in \hat{P}$ is included in the protected domain of a bridge $B_i \in R$. In other words, $l \in F(B_i)$.

Let E(R), denote all the links in the bridge set E(R) i.e., $E(R)=\{l|l \in B_i, B_i \in R\}$.

The Partial Information Model

Figure 1A:
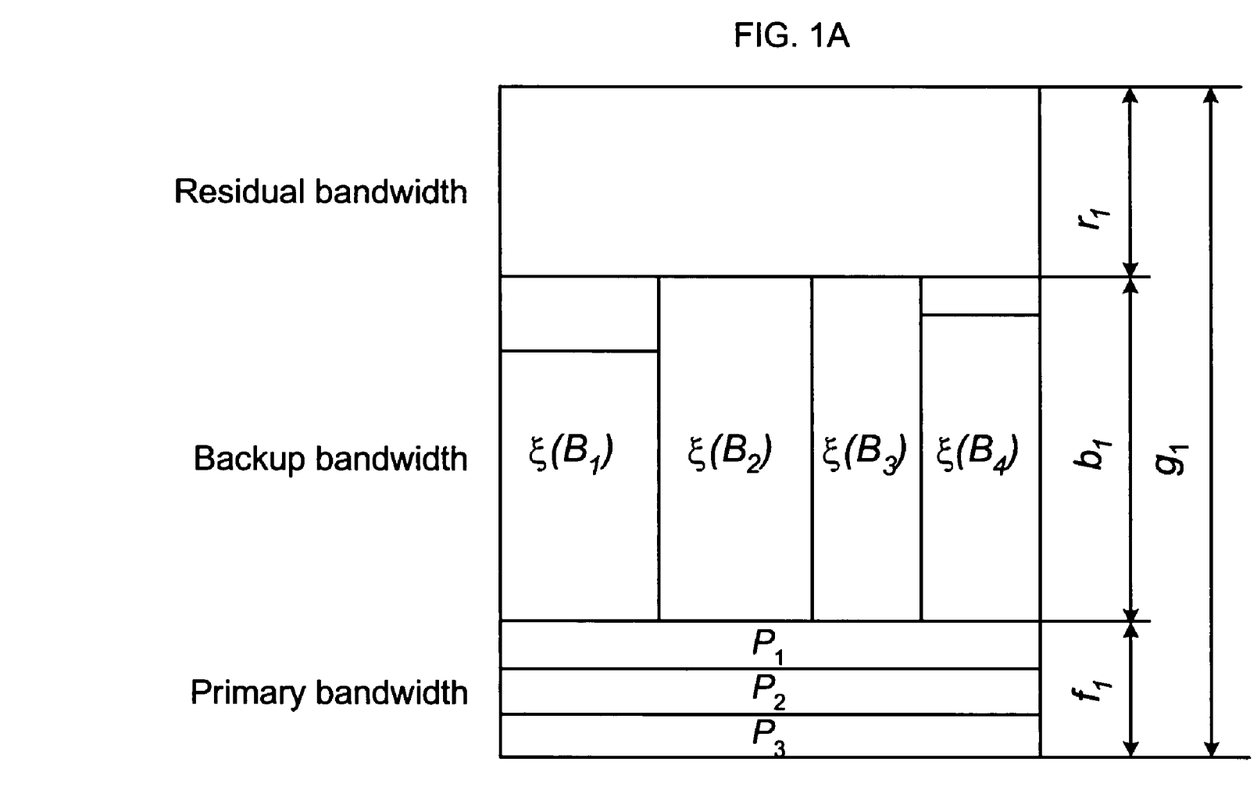
FIG. 1A is a diagram showing an example of a bandwidth allocation on a link l.

The Partial Information (PI) model of Kodialam et al. is used herein. The PI model maintains for each link $l \in E$ two parameters, in addition to the link capacity $g_l$. The first parameter is the link primary bandwidth, $f_l$, that represents the total amount of bandwidth reserved by primary paths that use link l. The second parameter is the link backup bandwidth, $b_l$, that specifies the total amount of bandwidth allocated for restoration over link l. For simplicity, $r_l$ is used to denote the residual (available) bandwidth of a link l. Thus, $r_l=g_l-f_l-b_l$. FIG. 1A is a diagram showing an example of a bandwidth allocation on a link l. The link l is included in three primary paths, $P_1, \ldots P_3$, and four bridges $B_1, \ldots, B_4$. The parameter $\zeta(B_i)$ estimates the maximum amount of bandwidth that will be rerouted on link l when bridge $B_i$ is activated. FIG. 1A graphically depicts how the bandwidth $f_l$ is allocated among dedicated primary paths. The bandwidth $b_l$ is shared among a plurality of bridges, and is sized large enough to accommodate the bridge (e.g., $B_2$) that requires the most bandwidth.

Consider a new connection (s, t, d) and let $\hat{P}=\{s, \ldots, t\}$ and $\hat{R}$ be its calculated primary path and bridge set, respectively. The primary path is feasible if $r_l \geq d$ for each link $l \in \hat{P}$, and the cost of the path is $C(P)=\Sigma_{l \in P} c_l \cdot d$. Similarly, it is desirable to check whether the given bridge set $\hat{R}$ is feasible and to determine its cost. This may be done by the following steps.

Step 1: For each bridge $B_i \in \hat{R}$, one identifies the maximal traffic flow (bandwidth) that the bridge may need to protect, denoted by $\zeta(B_i)$. Consider a link l protected by $B_i$. Since, in the worst case, a failure of l may cause all its primary path traffic to be rerouted via bridge $B_i$, $\zeta(B_i)$ must be at least $f_l+d$. Thus, set $$\zeta(B_i) = d + \max_{l \in F(B_i)} f_l$$

Step 2: Determine the amount $\beta_l$ of backup bandwidth required at each link $l \in E(\hat{R})$. Note that each link l that belongs to a bridge $B_i$ must have $\beta_l \geq \zeta(B_i)$. Because l can be shared by several bridges in $\hat{R}$, $\beta_l$ is set to be the maximum value of $\zeta(B_i)$ of all it's the bridges containing that link, i.e.

$$\beta_l = \max\{\zeta(B_i) | l \in B_i, B_i \in \hat{R}\}$$

Step 3: Determine, for each link $l \in E(\hat{R})$, the amount of additional backup bandwidth that needs to be allocated on link l, denoted by $\Delta b_l$. As noted above, a backup bandwidth $\beta_l$ should be sufficient to accommodate a flow of size $\beta_l$. However, enough backup bandwidth has already been allocated for protecting the previous connections. Thus $\Delta b_l$ should be at most d. Consequently, set $$\Delta b_l \leftarrow \min\{\beta_l-b_l, d\},$$

and $\Delta b_l$ is set to zero if this calculation yields negative value.

A bridge set $\hat{R}$ is considered feasible if each link $l \in \hat{R}$ has sufficient residual capacity in order to increase $b_l$ by $\Delta b_l$ units, i.e., $r_l \geq \Delta b_l$. The cost of the bridge set is $C(\hat{R})=\Sigma_{l \in E(R)} c_l \cdot \Delta b_l$ and the connection cost is $C(\hat{P})+C(\hat{R})$.

The examples below address two problems. The first one, denoted by "BS," is used as a building block in the solution of the second problem, referred to herein as "P+BS." The problems are defined as follows, Problem BS (Bridge Set): Given a connection request (s, t, d) and a feasible primary path $\hat{P}$ between s and t, find a minimum cost bridge set $\hat{R}$ for $\hat{P}$.

Problem P+BS (Primary+Bridge Set): Given a connection request s, t, d, find feasible primary path $\hat{P}$ and a Bridge Set $\hat{R}$ that their total cost $C(\hat{P})+C(\hat{R})$ is minimal.

In the following, OPT denotes the cost of an optimal solution to a considered problem.

Approximation Algorithm for Problem BS

This section introduces an approximation algorithm for Problem BS. As illustrated below, finding an optimal BS for a given primary path $\hat{P}$ is a complicated problem due to possible resource sharing of links among different bridges, so called internal sharing. However, there is an optimal BS in which each link is in included in at most 4 log n bridges, where n=|$\hat{P}$|. This property, allows use of a solution to a relaxed version of Problem BS that ignores internal sharing. For the relaxed problem, an optimal solution is found via dynamic programming, guaranteeing that the solution is indeed within a factor of at most 4 log n of the optimum.

However, there is an optimal BS with a bound on the number of bridges that contains any given link.

Given a primary path $\hat{P}$, there exists a BS $\hat{R}=\{B_1, B_2 \ldots, B_k\}$ for $\hat{P}$, such that $C(\hat{R})=OPT$ and each link $l \in E(\hat{R})$ belongs to at most 4 log n bridges, where n=|$\hat{P}$|.

This theorem enables one to define a variant of Problem BS, termed Problem BS*, where internal sharing is ignored, such that an optimal solution for Problem BS* is within a factor of 4 log n of the optimum solution of Problem BS.

Consider a request (s, t, d) and a feasible BS $\hat{R}=\{B_1, \ldots, B_k\}$. The Problem BS* ignores internal sharing by charging every bridge $B_i \in \hat{R}$ for all the additional backup bandwidth that it reserves for its needs, independent of whether these resources are used also by other bridges $B_j \in \hat{R}$. More specifically, consider a bridge $B_i \in \hat{R}$ that protect a traffic flow of $\zeta(B_i)$. For each link $l \in B_i$, the additional backup bandwidth needed on link l is calculated, i.e., $\Delta b_{l,i}=\min\{\zeta(B_i)-b_l, d\}$, ($\Delta b_{l,i}$ is at least 0). Thus, the contribution of link l to the cost of bridge $B_i$ is $c_l \cdot \Delta b_{l,i}$, the cost of $B_i$ is $C(B_i)=\Sigma_{l \in B_i} c_l \cdot \Delta b_{l,i}$, and $C(R)=\Sigma_{B_i \in R} C(B_i)$. The Problem BS* is formulated as follows, Problem BS* (BS without internal-sharing): Given a connection request (s, t, d) and a feasible primary path $\hat{P}$ between s and t, find a minimum cost bridge set $\hat{R}$ for $\hat{P}$, such that each bridge is charged separately for all the additional backup bandwidth that it needs.

Let In(G, $\hat{P}$, d) be an instance of Problem BS and let In'(G, $\hat{P}$, d) be an instance of Problem BS*. Then, OPT(In'(G, $\hat{P}$, d))$\leq$4 log n·OPT(G, $\hat{P}$, d)).

The following definitions are introduced.

Definition 1 (Interval): A subpath I of the primary path $\hat{P}$ (containing a subset of the links in the primary path) is referred to as an interval. The source and destination nodes of the interval I are denoted by s(I) and t(I), respectively. The size of the interval is defined to be the number of links in the interval.

Definition 2 (Inner Domain): Let $R=\{B_1, \ldots, B_k\}$ be a BS. The inner domain $I(B_i)$ of a bridge $B_i=\{s_i, \ldots, t_i\}$ is defined as the smallest interval that includes all links protected by $B_i$, i.e., $I(B_i)$ is the smallest interval for which holds $F(B_i) \subseteq I(B_i)$.

There is an optimal solution to Problem BS* with a useful optimum substructure property.

Property 1 (optimum substructure): A BS $R=\{B_1, \ldots, B_k\}$ has an optimum substructure property if for every pair of bridges $B_i, B_j \in \hat{R}$ one of the following holds:

1. Inner domains of $B_i$ and $B_j$ are nested one within other, i.e., $I(B_i) \subset I(B_j)$ or $I(B_j) \subset I(B_i)$.
2. Inner domains of $B_i$ and $B_j$ are disjoint, i.e., $I(B_i) \cap I(B_j) = \emptyset$.

Every instance $In'(G, \hat{P}, d)$ of Problem BS* has an optimal BS with the optimum substructure property.

The concept of superbridge is now defined.

Definition 3 (Superbridge): A superbridge H is a set of bridges, such that the inner domains of all bridges in H are nested within the inner domain $I(B_H)$ of a single bridge $B_H$ in H, i.e., for each bridge $B_i \in H$ it holds that $I(B_i) \subseteq I(B_H)$. The bridge $B_H$ is referred to as the leading bridge of H. Note that, in the trivial case where only a single link in the primary path $\hat{P}$ is considered, a bridge protecting only that one link is considered a superbridge containing only a leading bridge, and the set of bridges nested within the leading bridge is the empty set.

A superbridge H protects an interval I if, for any link $l \in I$, there exists a bridge $B \in H$ such that $l \in F(B)$.

Consider an optimal BS, R, with the optimum substructure property of any instance $In'(G, \hat{P}, d)$ of Problem BS*. Then, 1. The BS can be partitioned into a set of superbridges, each protecting an interval I of $\hat{P}$.
2. Each superbridge H that protects an interval I, in turn, can be recursively partitioned into a leading bridge $B_H$ and a set of superbridges each protecting a subinterval $I_j$ of I.

EXAMPLE 3

Figure 1B:
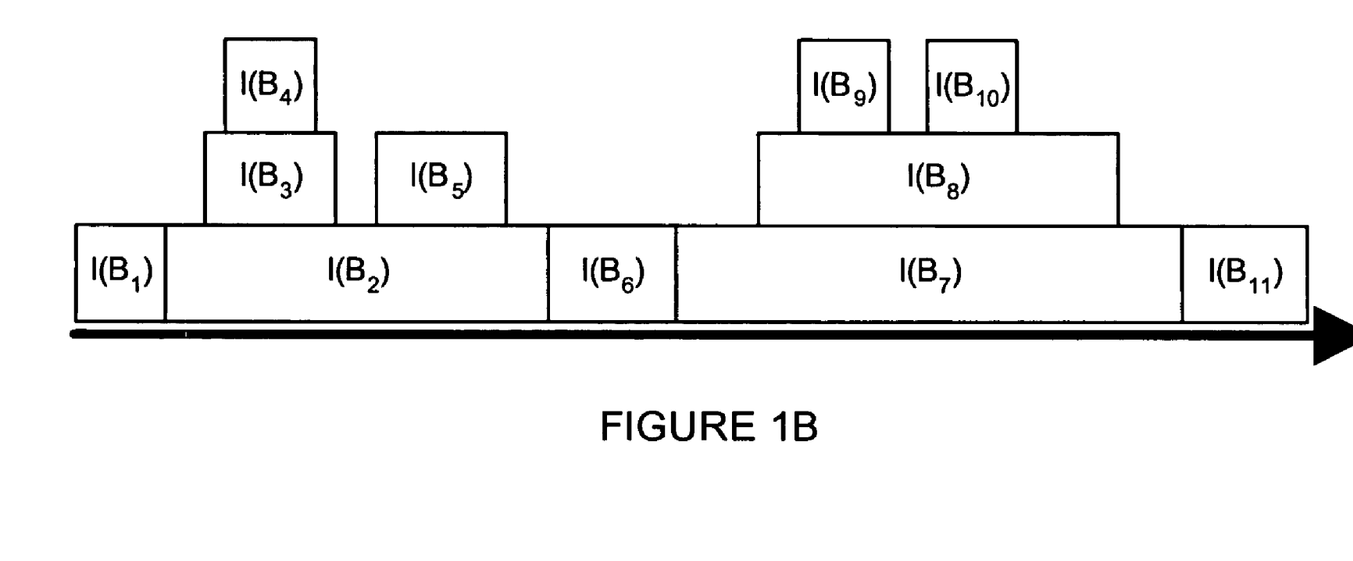
FIG. 1B is a diagram showing a bridge set having inner domains.

FIG. 1B demonstrates the inner domains of bridges in R. Bridges $B_2, B_3, B_4$ and $B_5$ form a superbridge, which, in turn, includes a superbridge formed by bridges $B_3$ and $B_4$.

Figures 2A, 2B, 2C:
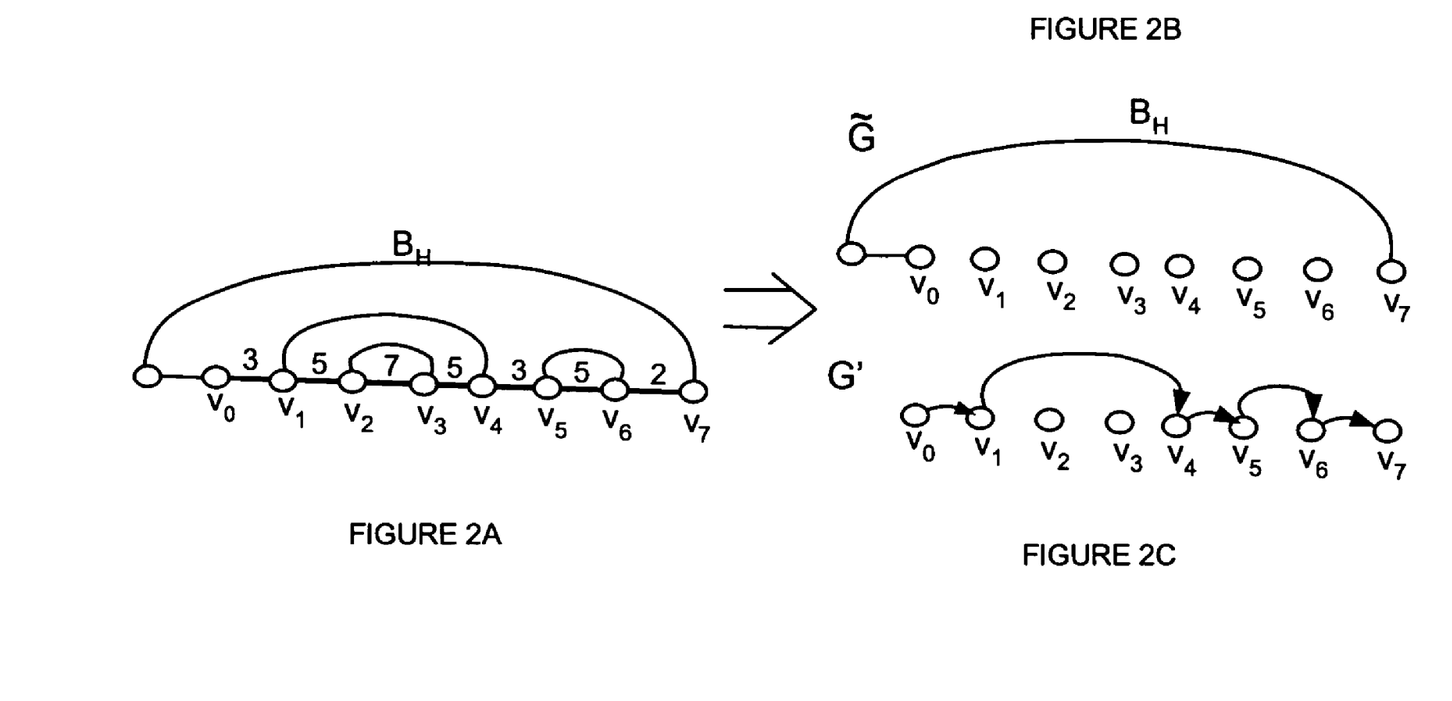
FIG. 2A is a schematic diagram of a superbridge.
FIG. 2B is a schematic diagram of the leading bridge of the superbridge in FIG. 2A.
FIG. 2C is a schematic diagram of the nested superbridges within the leading bridge of FIG. 2B.

The superbridge consists of the leading bridge $B_H$ and the set of bridges (Possibly even superbridges) nested within it. e.g., in FIG. 2A, $B_H$ is a leading bridge (outer bridge). There is a nested superbridge between $v_1$ and $v_4$, because it has bridges, with nesting. The bridge $v_1$ to $v_4$ is a leading bridge, with the bridge $v_2$ to $v_3$ nested therein.

Dynamic Programming Algorithm

Problem BS* has an optimal substructure property. This property can be used in order to establish a dynamic programming algorithm for this problem, suitable for an automated implementation on a computer processor. Given an instance $(G, \hat{P}, d)$ of Problem BS*, the algorithm determines the optimal superbridges for protecting every interval I of $\hat{P}$, beginning with intervals of length 1, then intervals of lengths 2 and so on up to the interval that includes the entire path. Then, the algorithm finds the minimal-cost set of superbridges that protects the entire path $\hat{P}$.

As noted above, a superbridge includes a leading bridge $B_H$ and a number of bridges whose inner domains are nested in $I(B_H)$. $\zeta$ is used to denote the parameter $\zeta(B_H)$ of $B_H$. Since $$\zeta(B_H) = d + \max_{l \in F(B_H)} f_l$$

and $F(B_H) \subseteq I$, then the value of $\zeta$ is determined by some link $l \in I$, i.e., $\zeta = f_l + d$. Hence, if interval I includes i links then there are up to i possible values of $\zeta$. Thus, for calculating the optimal superbridge of an interval I of $\hat{P}$, the algorithm invokes Procedure FIND (an example of which is provided in Table 2), described below, for each possible value of $\zeta$. $\zeta$ determines the minimum cost superbridge H with leading bridge $B_H$, such that $\zeta(B_H)=\zeta$. Finally, a superbridge of minimum cost is selected for each possible value of $\zeta$. The order of processing the intervals by the algorithm implies that when Procedure FIND is applied for an interval I, it already has available the optimal superbridge for each subinterval $I_j$ of I.

For a given interval I and a value of $\zeta$, the optimal superbridge is identified through the two following steps.

First, a minimum cost leading bridge $B_H=\{s_H, \ldots, t_H\}$ with $\zeta(B_H)=\zeta$ is identified, such that the subpath $P(s_H, t_H)$, defined by its end-points, encapsulates the interval I. For this purpose an auxiliary graph $\hat{G}$ is formed from G by removing links that belong to I. For each link in $\hat{G}$ a weight is assigned that indicates the link's possible contribution to the cost of the bridge $B_H$. The cost of each link l in bridge $B_H$ is determined by the amount of additional bandwidth $\Delta b_l$ that needs to be allocated on each link l of $B_H$:

$$\Delta b_l = \min\{\zeta - b_l, d\}.$$

Accordingly, the weight $w_l$ of l of each link not included in $\hat{P}$, is set to $c_l \cdot \Delta b_l$, while the links in $\hat{P} \setminus I$ are assigned a zero weight. The bridge $B_H$ is determined by finding a minimum weight path between $s(I)$ and $t(I)$ in $\hat{G}$.

Having identified the leading bridge $B_H$ other bridges in H are then identified. As noted above, the bridges in $H \setminus \{B_H\}$ can be partitioned into superbridges, each superbridge protecting a subinterval of I. Note that for each subinterval $I_j$ of I, the optimum superbridge is already available. Each link $l \in I$ for which holds $f_l + d \leq \zeta$ can be protected by the leading bridge $B_H$. Thus, a set of superbridges of minimum total cost is identified to protect all links in I for which $f_l + d > \zeta$. To this end, an auxiliary directed graph G' is constructed, which includes the nodes of I and the following directed links. For any link $l = (v_i, v_{i+1}) \in I$, such that $f_l + d \leq \zeta$, a link $(v_i, v_{i+1})$ is added with weight zero to G'. In addition, any two nodes, $v_i$ and $v_j$ in G', $i < j$, are connected by a link $(v_i, v_j)$, whose weight is set to the cost of optimal superbridge that protects the subinterval $\hat{P}(v_i, v_j)$ of I. Finally, the optimal set of nested bridges in H is determined by calculating the minimum weight path between $s(I)$ and $t(I)$ in G'.

EXAMPLE 4

FIG. 2A depicts an example of a superbridge of an interval $I = \{s(I) = v_0, v_1, \ldots, t(I) = v_7\}$. Here, the leading bridge $B_H$ protects all links $l \in I$ with $f_l \leq 3$.

The above process determines the optimal superbridge for each interval I of P. The optimum solution R is partitioned into a set of superbridges, each protecting an interval I of $\hat{P}$. Thus, R can either include a single superbridge that protects the entire path $\hat{P}$ or comprises several superbridges. Note that the minimum cost of a superbridge that protects the entire path $\hat{P}$ is already known. In order to compute the set of superbridges that protects each link $l \in \hat{P}$ of minimum total cost, a procedure such as Procedure FIND is invoked for $\hat{P}$ and $\zeta = 0$. A formal description of the algorithm appears in Tables 1 to 3.

Figure 3:
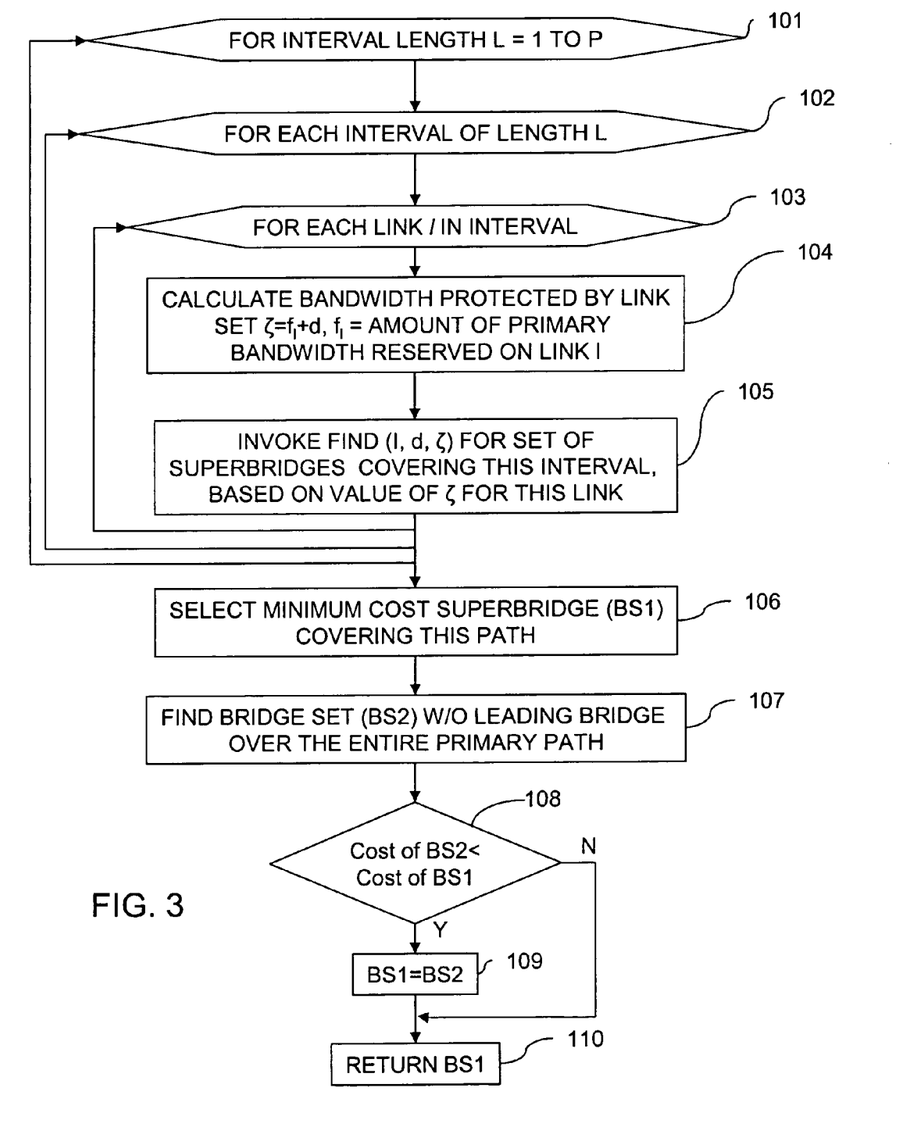
FIG. 3 is a flow chart diagram of an exemplary method for finding an optimum bridge set.

The above-described process may be implemented on a variety of computer platforms in any of a variety of programming languages. Table 1 presents pseudocode for a procedure for a bridge set selecting means for selecting the bridge set. FIG. 3 shows a flow chart for performing this method.

TABLE 1

Algorithm BS $(G, \hat{P}, d)$
input:
    G = the graph;
    $\hat{P} = \{s = v_0, v_1, \ldots, v_n = t\}$ – primary path;
    d = the bandwidth requirement;

TABLE 1-continued

```
output:
    R̂ = A solution to Problem BS*.
101 for intervalLength ← 1 to |P̂| do
102   for each interval I of length intervalLength do
103     for each link l ∈ I do
104       ζ ← f_l + d
105       R_I^l ← Find (I,d,ζ)
106     R̂_I ← arg min_{l∈I} C(R_I^l)
107 R_I^l ← Find (I,d,0)
108 if C(R̂_p̂) < C(R̂) then
109   R̂ ← R̂_p̂
110 return R̂
```

The algorithm BS uses dynamic programming. It begins with small subpaths of the primary path, more specifically, it begins with intervals of length 1, then length 2, etc. In each iteration, for each subpath of length y, the procedure finds a superbridge that covers length y+1. It begins from the bottom and proceeds upward (in terms of interval length).

Algorithm BS, line 101, loops across from the smallest interval length (i.e., 1), and proceeds to higher intervals. At step 102, for each given interval length, the nested loop is repeated for every interval having that length. At step 103, the nested loop is repeated for each link and the given interval. For intervals of length 1, the solution is trivial—it's just a simple bridge. Then the nested loops proceed to subpaths of increasingly higher length. A superbridge of length 1 may be defined as just consisting of a leading bridge, with no nested bridges. If a subpath of length 1 is considered, then it can be considered a superbridge without nesting. Note that it is also possible to have a subpath of length 2 with only one bridge.

Within the nested loops, the value ζ in step 104 is a scalar, defined by $$\zeta(B_i) = d + \max_{l \in F(B_i)} f_l.$$

For each bridge B, the corresponding ζ(B) can be computed. Note that for a given bridge that protects a plurality of primary links, the primary bandwidth requirements $f_l$ for each link may be different, and any one of the links may present the largest bandwidth requirement that determines ζ. Therefore, ζ is not known in advance. The nested loop from steps 103-105 tries all possible values of ζ, performing an exhaustive search. The value $$\zeta(B_i) = d + \max_{l \in F(B_i)} f_l$$

depends on the set F(Bi). However this set is not known in advance when one calculates the leading bridge and its cost.

In step 105, procedure Find is invoked to find the respective superbridge $R_I^l$ for a given interval and given value of ζ corresponding to a given link.

In step 106, R̂_I is selected as the minimum cost superbridge among all the superbridges for the interval determined during iterations of step 105.

In step 107 of algorithm, this is just the case where there is no leading bridge for the entire path. It can happen that there is no outer bridge, but instead there are two adjacent bridges. For example, given a path of consecutive nodes $v_1$ to $v_7$, there can be a first sub-bridge that protects the entire interval $v_1$-$v_4$, and another sub-bridge that protects $v_4$-$v_7$. So there is a superbridge with no outer bridge. Step 107 finds a solution for the entire path s-t. Another possibility is that the entire path from $v_1$ to $v_7$ is protected by more than one superbridge. Each superbridge protects some subinterval, with no single leading bridge. Step 107 also handles these cases. Invoking procedure Find with ζ=0 is the same as invoking it with no leading (outer) bridge. Step 107 is only invoked once.

In step 108, the solution from steps 101-106 is compared with the solution from step 107. The solution having the lower cost is selected in steps 108 and 109, and the solution is returned at step 110.

Figure 4:
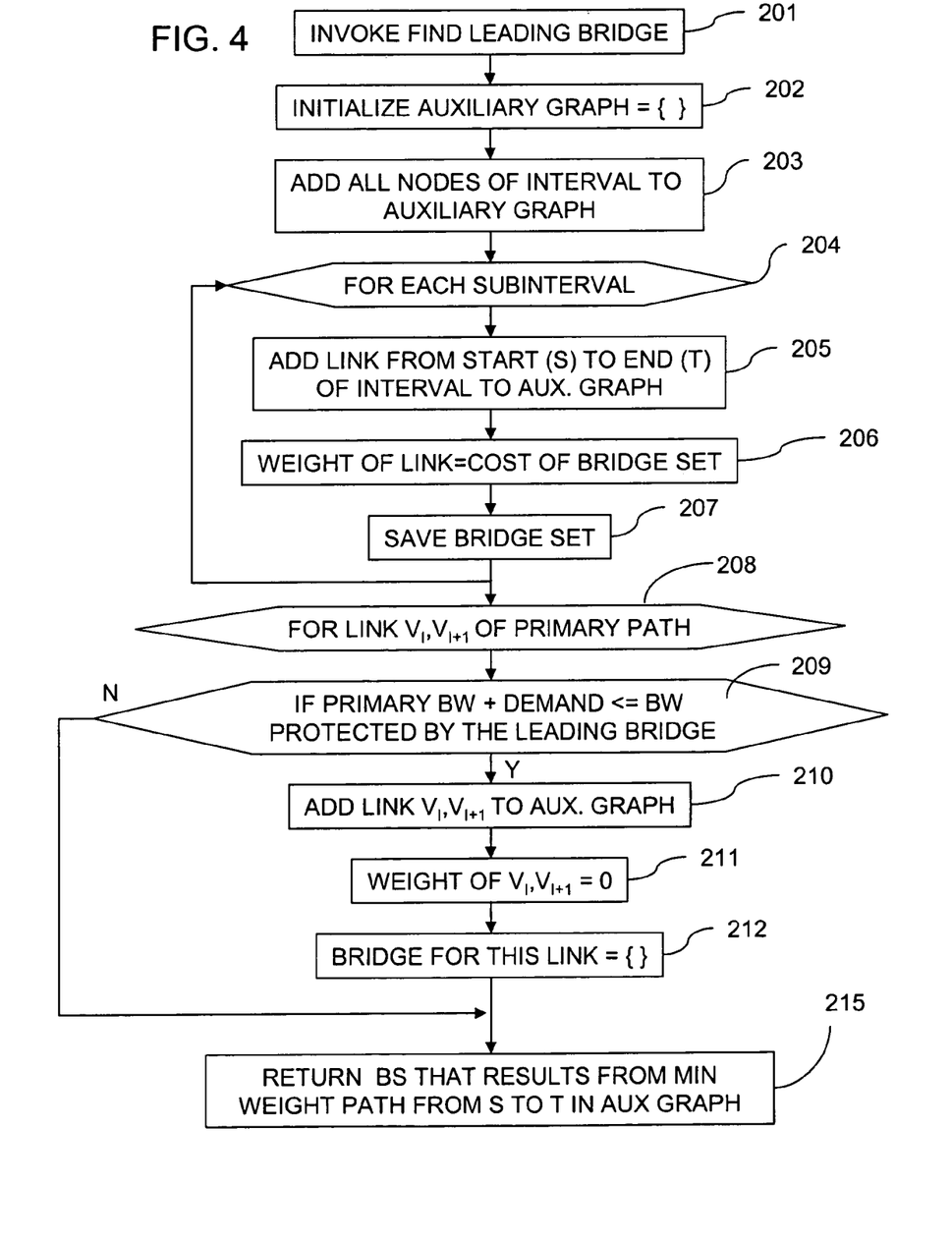
FIG. 4 is a flow chart diagram of the procedure for finding a superbridge invoked in FIG. 3.

Table 2 provides exemplary code for Procedure Find, which provides a means for determining a plurality of bridges for protecting respective subsets of the plurality of primary links. FIG. 4 is a flow chart of this procedure. This procedure is given the parameters I (interval), d (bandwidth demand), ζ (amount of traffic protected by bridge $B_i$). A description of the procedure follows.

TABLE 2

```
Procedure Find (I,d,ζ)
201 B ← FindLeadingBridge (I,d,ζ)
202 G' ← ∅
203 Add all nodes of interval I to G'
204 for each subinterval I_i of I do
205     add a link l =(s(I_i),t(I_i)) to G'
206     w_l ← C(R̂_{I_i})
207     T_l ← R̂_{I_i}
208 for link (v_i,v_{i+1}) of P̂ do
209     if f_{(v_i,v_{i+1})} + d ≤ ζ then
210         add (v_i,v_{i+1}) to G'
211         w_{(v_i,v_{i+1})} ← 0
212         T_{(v_i,v_{i+1})} ← ∅
213 Find a minimum weight path P between s(I) to t(I) in G'
214 R̂ = {T_l|l ∈ P}
215 return R̂
```

At step 201, Procedure Find invokes Procedure FindLeadingBridge (Table 3). This provides the leading bridge for the superbridge protecting interval I. This superbridge includes a leading bridge and a number of superbridges nested inside it. The remaining task is to determine which bridges are nested inside the leading bridge. For this purpose, the procedure builds an auxiliary graph. (An example of an auxiliary graph is provided in FIG. 2C.) The auxiliary graph is a data structure constructed in order to select the desired superbridges.

At step 202, the auxiliary graph G' is initialized to the empty or null set. At step 203, all nodes in interval I are added to the auxiliary graph. At step 204, a loop of steps 205-207 is performed for each subinterval $I_i$ of I, beginning with subintervals of length 1 and ending with the full interval I. Note that if the interval I has length 1, the interval has no subintervals, and the loop of step 204 is skipped. At line 205 the loop adds a link from the beginning of the subinterval $I_i$ to end of the subinterval. At step 206, the weight $w_l$ of this link is calculated as the cost $C(R̂_{I_i})$ of the optimal superbridge between beginning and end of subinterval $I_i$. Note that the superbridge $R̂_{I_i}$ is available through previous invocations of Procedure Find.

When Procedure Find is invoked for an interval of length l, the optimal superbridge that protects this subinterval is already known, because the procedure is based on dynamic programming. The process begins from superbridges to protect intervals of smaller lengths and then proceeds to higher lengths. Procedure Find is invoked first for smaller intervals and then for bigger intervals. For example, when Procedure Find is invoked for interval of length 1, the loop beginning at step 204 is skipped, because there are no subintervals. But when procedure Find is invoked for intervals of length 3, for example, all optimal sub-bridges for subintervals of lengths 2 and 1 have already been determined. For this reason, the program already knows that, for each subinterval, the optimal superbridge is protected. The procedure can merely select the set of internal superbridges. This is the stage at which the process looks at the solutions for each smaller sized subinterval and picks one that works best. The auxiliary graph is used for this purpose.

For example, in FIGS. 2A-2C, suppose I is the interval between the leftmost node and $v_7$. The auxiliary graph is shown in FIG. 2C. All nodes that belong to this interval are determined, and then for each subinterval, there is a link $v_1$-$v_4$, so for this sub-bridge, so in this stage the optimal superbridge protects $v_1$-$v_4$. For each interval the optimal superbridge that protects it is known. This superbridge is then represented by a link in the auxiliary graph. For example, in FIG. 2C the optimal superbridge that protects subinterval between v_1 and v_4 is represented by link ($v_1$-$v_4$). A link is included that describes the superbridge $v_1$-$v_4$. All nodes can be protected between $v_1$-$v_4$ by this superbridge, so the entire superbridge can be represented by a link. So links $v_1$-$v_4$ and $v_5$-$v_6$ are included. And this is done for every subinterval of smaller length in steps lines 204-208. Thus, the superbridges are selected from the pool of superbridges determined in the previous steps. Every superbridge is represented by a link. Also in lines 208-212, it is known that some of the links of the primary path are protected by the leading bridge. The weight of these links is set to 0 at step 211, because there is no incremental cost for using this links.

So the auxiliary graph is constructed by representing each sub-bridge by a link. There are also some links protected by a leading bridge, e.g., in FIG. 2A, some of the links like $v_0$-$v_1$ and $v_4$-$v_5$ are protected by a leading bridge. So they are added to the auxiliary graph. For example, in FIG. 2C, $v_0$-$v_1$ and $v_4$-$v_5$ are protected by the leading bridge. Then on the auxiliary graph, in step 213, the minimal weight path is found between source and destination. This minimal weight path corresponds to a set of optimal sub-bridges—internal superbridges. This is the purpose. $T_1$ is used in order to remember, for each link, the original superbridge this link represents. At step 215, the Procedure Find returns the set of these superbridges.

Figure 5:
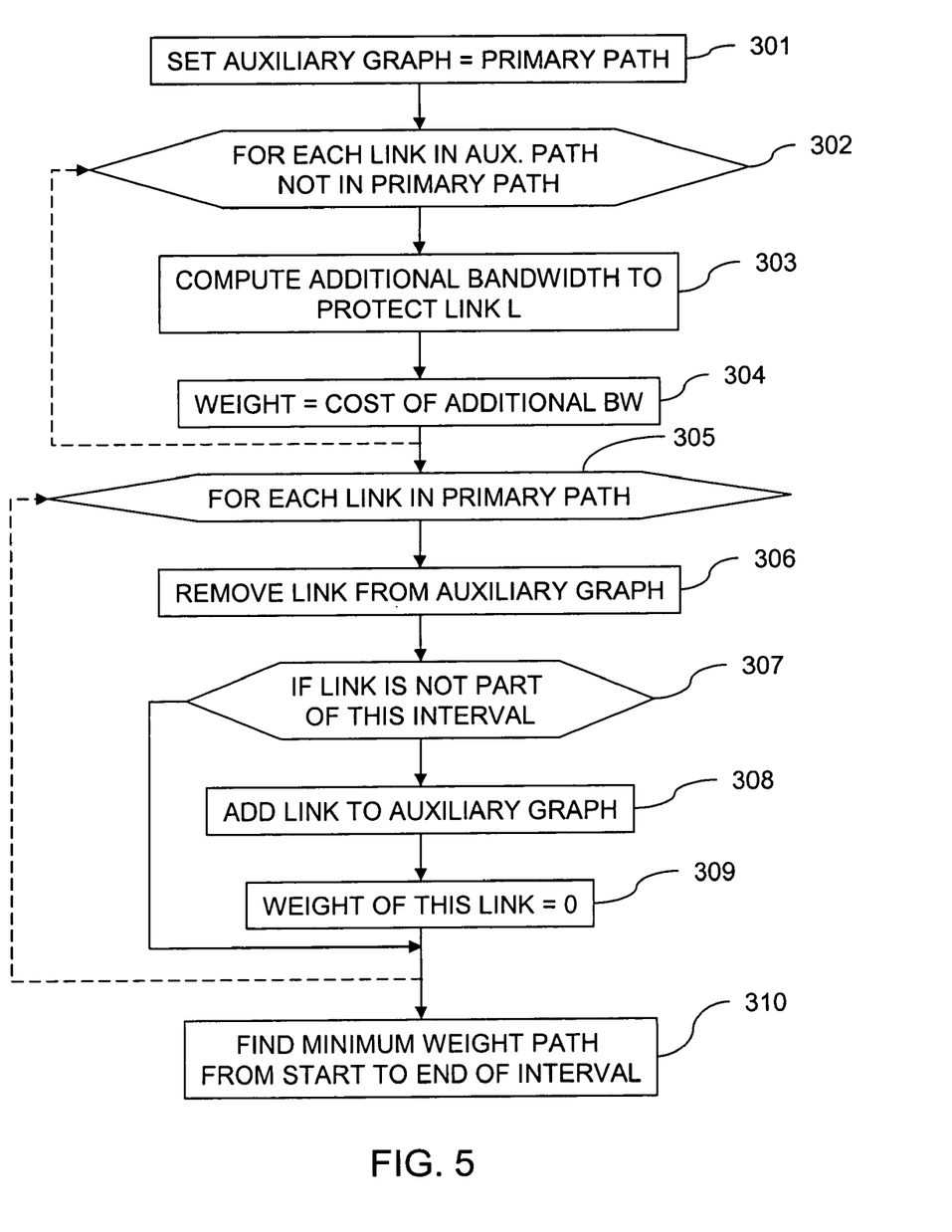
FIG. 5 is a flow chart diagram of the procedure for finding a leading bridge, invoked in FIG. 4.

Table 3 provides exemplary code for the procedure FindLeadingBridge, which determines a leading bridge, given (I, ζ, d). FIG. 5 is a flow chart of this procedure. This procedure finds a path between the beginning and end of interval I, without any sub-bridges.

TABLE 3

| | Procedure FindLeadingBridge (I,d,ζ) |
|---|---|
| 301 | $\hat{G} \leftarrow G$ |
| 302 | for each link $l \in \hat{G}, l \notin \hat{P}$ do |
| 303 | $\Delta b_l \leftarrow \min\{d, \max(\zeta - b_l, 0)\}$ |
| 304 | $w_l \leftarrow c_l \cdot \Delta b_l$ |
| 305 | for each link $l(v_i, v_{i+1}) \in \hat{P}$ do |
| 306 | Remove l from $\hat{G}$ |
| 307 | if $l \notin I$ then |
| 308 | Add $(v_{i+1}, v_i)$ to $\hat{G}$ |
| 309 | $w_{(v_{i+1}, v_i)}$ 0 |
| 310 | Find a minimum weight path $\hat{B}$ between s(I) and t(I) in $\hat{G}$ with respect to $w_l$ |
| 311 | return to $\hat{B}$ |

In a similar fashion to Procedure Find, this routine uses an auxiliary graph. Initially, at step 301, this procedure copies the data structure G to the auxiliary structure $\hat{G}$.

The loop of steps 302-304 is performed for each link in the auxiliary graph that is not a primary link. It is necessary to identify how to pay for this link. At step 303, the procedure computes $\Delta b_l$—the amount by which the backup bandwidth on this link is to be increased if this link is to be used as a leading bridge. Then step 304 determines its weight, which is denoted by $w_l$.

Then steps 305-306 remove all links from the primary path from the auxiliary graph, because links in the primary path cannot be in the leading bridge.

Steps 307-309 provide an optional capability to use a bridge that excludes the link to be protected, but runs in the opposite direction. For example, in FIG. 2C, between nodes $v_1$ and $v_4$, a leading bridge may be formed from $v_1$- to $v_0$, then to left, then using the leading bridge $v_0$-$v_7$, then to $v_7$-$v_6$ to $v_5$-$v_4$. Note that in this option, the bridge protecting the interval $v_1$-$v_4$ includes links of the primary paths that are outside of the interval.

At step 310, the procedure finds the minimum weight path between s and t, and this path is the leading bridge.

The algorithm described above may be used for any embodiment having one or more primary paths. Each of the one or more primary paths may have two or more nodes, and one or more subpaths connecting the two or more nodes. It will be understood by those skilled in the art that the use of the algorithm is particularly advantageous when there are multiple primary paths, each having multiple subpaths, because the complexity of the allocation problem is greater in such configurations.

Approximation Algorithm for Problem P+BS

This section provides an approximation algorithm for Problem P+BS, i.e., computing a simultaneous providing of a primary path and bridge set. The following simple algorithm may be used:

1. Find a path P between s and t such that for each link $l \in P$ it holds that $r_l \geq d$ and the cost of the path $C(P) = d\Sigma_{l \in P} c_l$ is minimum.

2. Find a bridge set R for $\hat{P}$ by applying Algorithm BS for $\hat{P}$ and d.

This algorithm is referred to herein as Algorithm P+BS. This algorithm provides a solution for Problem P+BS whose cost is at most 4 log n+1 times the optimum. Intuitively, this result is based on two observations. The calculated primary path is denoted by P and the optimal solution for Problem P+BS is denoted by ($P^{opt}$, $R^{opt}$), where $P^{opt}$ is a primary path and $R^{opt}$ is an optimal bridge set. Since P is a minimum cost path between s and t that satisfies bandwidth requirements, it follows that $C(P) \leq C(P^{opt})$. A second observation is that $P^{opt}$ and $R^{opt}$ can be used to construct a bridge set for P. In other words, for every link $l \in P$ there is a bridge $B = \{s, \ldots, t\}$, such that its end-points s and t are nodes in P and $B \subset P^{opt} \cup R^{opt}$.

Algorithm P+BS computes, in $O(n^3(M+N \log N))$ time, a solution for Problem P+BS whose cost is at most 4 log n+1 times the optimum.

In other embodiments, it is contemplated to extend the usage of the above described local restoration approach also for the complete information model and other restorable connection provision problems.

Although the example described in detail above explained how the algorithm is applied to allocate bridges for one primary path, the algorithm may be used to allocate the bandwidth on the link to provide respective bridge sets for each of a plurality of primary paths on that link, in the manner shown in FIG. 1A.

Although an example is described above in which a single source node performs the dynamic routing computations for all of the primary paths, the computation of each path and bridge set can be performed separately for each connection (by the respective source node. Thus, the dynamic routing function can be distributed throughout a network.

For example if two connections originated at A and B, respectively, there are two primary paths P(A) and P(B), and two bridge sets R(A) and R(B), such that P(A) and R(A) are computed by the node A and P(B) and R(B) are computed by node B. Thus, the algorithm is distributed to that extent. Note that R(A) and R(B) can share bridges, to provide a distributed method that achieves bandwidth sharing.

For a given connection (primary path), the computation of the primary path and bridge set may be performed by the respective source node. However, this method can be extended, so other nodes will participate in the computation. Any number (one or more) of source nodes within the network may perform the routing function for one or more primary paths of the network.

Thus, a network may have at least two primary paths, and a plurality of nodes, the plurality of nodes including at least two source nodes that allocate bandwidth for respective ones of the primary paths. Each of the at least two source nodes comprises a computer processor programmed to identify a bridge set corresponding to a respective one of the at least two primary paths. Each bridge set includes a plurality of bridges, such that each link of the respective primary path is protected by at least one bridge of the respective bridge set. Each bridge protects a subpath connecting two of the plurality of nodes included within the corresponding one of the primary paths. Each bridge has at least one link. None of the bridges shares any link with the subpath of the respective primary path protected by that bridge. A first one of the bridges that protects one of the subpaths of the first primary path and a second one of the bridges that protects one of the subpaths of the second primary path have at least one common link.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ disks, memory sticks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

We claim:

1. A computer implemented method for allocating bandwidth in a network having multiple primary paths, the method comprising:

using a computer to identify a respective bridge set for each of at least two different primary paths of the multiple primary paths, the primary path defined by a respective source node and a destination node, wherein each bridge set comprises a plurality of bridges, such that:

each link of the respective primary path is protected by at least one bridge of the respective bridge set, each bridge comprises at least one link and protects a subpath connecting two nodes of one of the at least two primary paths, and each bridge is link-disjointed from a respective subpath that the bridge protects, wherein a first bridge protecting a subpath of one of the at least two primary paths and a second bridge protecting a subpath of another of the at least two primary paths have at least one common link.

2. The method of claim 1, wherein the using the computer to identify the respective bridge set comprises executing a dynamic programming algorithm.

3. The method of claim 2, wherein the dynamic programming algorithm comprises:

for each value of i from i=1 to a maximum subpath length of the primary path, wherein i represents a subpath length defined by a number of links in the subpath:

selecting a bridge set for protecting each subpath of the primary path having length i, such that all subpaths of length less than or equal to i are protected by the selected bridge set comprising one or more bridges that are nested within one another or link-disjoint from one another.

4. The method of claim 3, wherein the using a computer to identify the respective bridge set further comprises:

identifying a minimum cost bridge subset from the selected bridge sets, such that the minimum cost bridge subset protects all subpaths of the primary path.

5. The method of claim 1, further comprising guaranteeing quality of service with respect to bandwidth when a link or a node of one or more of the at least two primary paths fails.

6. The method of claim 1, wherein the respective bridge set includes a leading bridge and a set of bridges nested within the leading bridge, such that an inner domain of each nested bridge is nested within an inner domain of the leading bridge.

7. The method of claim 1, further comprising selecting a minimum cost primary path before using the computer to identify the respective bridge set.

8. The method of claim 1, wherein the respective set of bridges comprises a plurality of superbridges, each of the plurality of superbridges comprising a leading bridge, wherein at least one of the plurality of superbridges further comprises a plurality of inner bridges nested within the leading bridge.

9. A computer readable medium encoded with computer executable instructions, such that when the computer executable instructions are executed by a processor, the processor performs a computer implemented method for allocating bandwidth in a network having multiple primary paths, the method comprising:

identifying a respective bridge set for each of at least two link-disjoint primary paths of the multiple primary paths, each bridge set comprising a plurality of bridges, such that:

each link of the respective primary path is protected by at least one bridge of the respective bridge set, each bridge comprises at least one link and protects a subpath connecting two nodes of one of the at least two primary paths, and each bridge is link-disjointed from a respective subpath that the bridge protects, wherein
a first bridge protecting a subpath of one of the at least two primary paths and a second bridge protecting a subpath of another of the at least two primary paths have at least one common link.

10. The computer readable medium of claim 9, wherein the identifying the respective bridge set further comprises:
executing a dynamic programming algorithm for the respective primary path.

11. The computer readable medium of claim 10, wherein the dynamic programming algorithm comprises:
for each value of i from i=1 to a maximum subpath length of the primary path, wherein i represents a length of a subpath defined by a number of links in the subpath:
selecting a bridge set for protecting each subpath of the primary path having length i, such that all subpaths of length less than or equal to i are protected by the selected bridge set comprising one or more bridges that are nested within one another or link-disjoint from one another.

12. The computer readable medium of claim 11, wherein the identifying the respective bridge set includes identifying a minimum cost subset of the selected bridge sets, such that the subset protects all subpaths of the primary path.

13. The computer readable medium of claim 9, wherein the method further comprises:
guaranteeing quality of service with respect to bandwidth when a link or a node of one or more of the at least two primary paths fails.

14. The computer readable medium of claim 9, wherein the respective bridge set includes a leading bridge and a set of bridges nested within the leading bridge, such that an inner domain of each nested bridge is nested within an inner domain of the leading bridge.

15. The computer readable medium of claim 9, wherein each respective set of bridges comprises a plurality of superbridges, each of the plurality of superbridges comprising a leading bridge, wherein at least one of the plurality of superbridges further comprises a plurality of inner bridges nested within the leading bridge.

16. A system for allocating bandwidth in a network having at least two primary paths, the system comprising:
a computer processor programmed to identity a protecting bridge set for each primary path, two or more of the at least two primary paths originating from different source nodes in the network, wherein each protecting bridge set comprises a plurality of bridges, such that:
each link of the respective primary path is protected by at least one bridge of the respective bridge set, and
each bridge comprises at least one link and protects a subpath connecting two nodes of one of the at least two primary paths,
wherein none of the plurality of bridges shares any link with a subpath of the respective primary path protected by the bridge, and one of the plurality of bridges that protects a subpath of one of the at least two primary paths and another of the plurality of bridges that protects another subpath of another of the at least two primary paths have at least one common link.

17. The system of claim 16, wherein the computer processor is programmed to execute a dynamic programming algorithm.

18. The system of claim 17, wherein the dynamic programming algorithm comprises:
for each of the at least two primary paths:
for each value of i from i=1 to a maximum subpath length of the primary path, wherein i represents a length of a subpath defined by a number of links in the subpath:
selecting a bridge set for protecting each subpath of the primary path having length i, such that all subpaths of the primary path having length less than or equal to i are protected by the selected bridge set comprising one or more bridges that are nested or link-disjoint from one another.

19. The system of claim 18, wherein the computer processor is further configured to identify as the protecting bridge set minimum cost bridge subset selected from the selected bridge sets, such that the minimum cost subset protects all subpaths of the primary path.

20. The system of claim 16, wherein the system is further configured to guarantee quality of service with respect to bandwidth when a link or a node of one or more of the at least two primary paths fails.

21. The system of claim 16, wherein the identified bridge set comprises at least one leading bridge and a set of bridges nested within the leading bridge, such that an inner domain of each nested bridge is nested within an inner domain of the leading bridge.

22. The system of claim 16, wherein the computer processor is further configured to select a minimum cost primary path before identifying the bridge set.

23. A network comprising:
a plurality of nodes; and
a plurality of links connecting the plurality of nodes, wherein the plurality of nodes and the plurality of links define at least two link-disjoint primary paths in the network, each primary path comprising a respective source node configured to allocate bandwidth for the primary path, wherein the respective source node comprises:
a computer processor programmed to identify a bridge set for protecting the primary path, the identified bridge set including a plurality of bridges, such that:
each link of the primary path is protected by at least one bridge of the identified bridge set,
each bridge comprises at least one link and protects a subpath connecting two of nodes included within the primary path, and
each of the plurality of bridges is link-disjointed from a respective subpath that the bridge protects,
wherein at least two different bridges protecting respectively subpaths of the at least two link-disjoint primary paths share at least one common link.

24. A method for allocating a bandwidth in a network, the method comprising:
allocating a bridge set for protecting a given primary path in the network, the primary path comprising a plurality of nodes and a plurality links connecting the plurality of nodes, wherein:
the allocated bridge set comprises a plurality of bridges, each bridge protecting a subpath of the primary path, the subpath including one or more links of the primary path, such that each link of the primary path is protected by at least one bridge of the allocated bridge set;
each of the plurality of bridges is link-disjointed from a respective subpath that the bridge protects; and
the plurality of bridges comprises a plurality of superbridges, each of the plurality of superbridges comprising a leading bridge, wherein at least one of the plurality of superbridges further comprises a plurality of inner bridges nested within the leading bridge.

25. The method of claim 24, wherein a first of the plurality of superbridges is nested within a second of the plurality of superbridges.

26. The method of claim 24, wherein the allocating further comprises:
    using a dynamic algorithm to determine bridges for protecting each subpath of the primary path, starting with subpaths comprising a single link and incrementally proceeding up to a subpath comprising the primary path; and
    selecting, from the determined bridges a minimal cost bridge set that protects the primary path as the allocated bridge set for protecting the primary path.

* * * * *

UNITED STATES PATENT AND TRADEMARK OFFICE
CERTIFICATE OF CORRECTION

PATENT NO.       : 7,606,142 B2
APPLICATION NO.  : 10/955265
DATED            : October 20, 2009
INVENTOR(S)      : Bejerano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1207 days.

Signed and Sealed this

Fourteenth Day of December, 2010

David J. Kappos
*Director of the United States Patent and Trademark Office*